United States Patent [19]

Spoto

[11] Patent Number: 5,097,929
[45] Date of Patent: Mar. 24, 1992

[54] ADJUSTABLE SHOCK ABSORBER

[75] Inventor: Louis M. Spoto, Arlington Heights, Ill.

[73] Assignee: Maremont Corporation, Carol Stream, Ill.

[21] Appl. No.: 657,153

[22] Filed: Feb. 19, 1991

[51] Int. Cl.⁵ .............................. F16F 9/34; F16F 5/00
[52] U.S. Cl. ..................... 188/319; 188/282; 188/299
[58] Field of Search .................. 188/299, 319, 322.15, 188/282, 285, 289

[56] References Cited

U.S. PATENT DOCUMENTS

| | | | |
|---|---|---|---|
| 4,113,072 | 9/1978 | Palmer | 188/282 |
| 4,632,228 | 12/1986 | Oster et al. | 188/322.15 |
| 4,997,068 | 3/1991 | Ashiba | 188/282 |
| 5,035,306 | 7/1991 | Ashiba | 188/299 |

FOREIGN PATENT DOCUMENTS

| | | | |
|---|---|---|---|
| 3231739 | 3/1984 | Fed. Rep. of Germany | 188/299 |
| 3344029 | 6/1985 | Fed. Rep. of Germany | 188/285 |
| 3544474 | 6/1987 | Fed. Rep. of Germany | 188/282 |

Primary Examiner—Joseph F. Peters, Jr.
Assistant Examiner—Virna Lissi Mojica
Attorney, Agent, or Firm—McAndrews, Held & Malloy, Ltd.

[57] ABSTRACT

A hydraulic shock absorber utilizing variable fluid pressures to change the dampening characteristics of the shock absorbers, both during its compression stroke and its recoil stroke. A piston assembly of the shock absorber divides the damping fluid chamber of the shock absorber into a recoil chamber and a compression chamber. The piston assembly carries a recoil valve and a compression valve that control the flow of damping fluid across the piston assembly between the recoil and compression chambers. Pressure of a second fluid introduced into the piston assembly through a passage in the piston rod and biases the recoil and compression valves to closed positions. The pressure of the damping fluid in the compression chamber and in the recoil chamber bias the recoil and compression valves toward their open positions. The pressurized fluid passage in the piston rod is connected, outside the shock absorber, with a source of fluid whose pressure may be selectively varied.

20 Claims, 3 Drawing Sheets

ADJUSTABLE SHOCK ABSORBER

BACKGROUND OF THE INVENTION

The present invention relates to shock absorbers or dampers, such as shock absorbers used on automotive vehicles, and more particularly, to an infinitely adjustable shock absorber that utilizes variable fluid pressures to change the dampening characteristics of the shock absorber, both during its compression stroke and its recoil stroke.

In the past, it has been recognized that the ability to change the dampening characteristics of hydraulic shock absorbers or dampers would be an advantageous and desirable improvement. Numerous attempts to do this have been undertaken, but there remains a heretofore unsatisfied need for a shock absorber whose dampening characteristics may be readily and easily changed over a relatively wide range and which can still be manufactured at a reasonable, competitive cost.

In some proposed adjustable hydraulic shock absorbers, damping force levels were not very consistent and repeatable because of the variation in the spring constant of the mechanical springs employed to bias the valves. Similarly, recoil to compression force ratios were limited to the ratio of the piston rod diameter to piston assembly diameter. Others required a relatively large number of component parts to achieve changes in dampening forces. The usage of such numerous parts increased the cost and complexity of the proposed shock absorbers. These are negatives to the successful commercial exploitation of the shock absorbers.

SUMMARY OF THE INVENTION

In principal aspects, the present invention affords an improved hydraulic shock absorber or damper whose dampening characteristics, both during its compression and recoil strokes, may be facilely and infinitely adjusted by changing the pressure of a second fluid introduced into the piston assembly through a passage in the piston rod. The piston assembly divides the fluid chamber of the inner cylindrical body of the shock absorber into a recoil chamber and a compression chamber. This assembly also includes recoil and compression valves. They control the flow of hydraulic fluid through the piston assembly (that is, flowing from the compression chamber to the recoil chamber or visa versa) during displacement of the piston assembly within the fluid chamber in the inner cylindrical body due to the application of forces, in a conventional manner, to the piston rod and/or to the outer cylindrical body of the shock absorber.

The selectively pressurized second fluid biases the recoil and compression valves to a position controlling or restricting the flow of damping fluid. The compression valve is subject to the pressure of the hydraulic fluid in the compression chamber, and the recoil valve is subject to the pressure of the hydraulic fluid in the recoil chamber. During a compression or recoil stroke of the shock absorber, the applicable valve will be opened when the pressure of the hydraulic damping fluid within the related chamber is sufficient to overcome the valve biasing force. A change in the pressure of the pressurized fluid biasing the valves results in a proportional change in the hydraulic damping fluid pressure required to overcome the valve biasing force.

Accordingly, it is a principal object of the present invention to provide an improved, infinitely adjustable hydraulic shock absorber utilizing variable fluid pressures to change the damping characteristics of the shock absorber, both during its compression strokes and its recoil stroke.

Another object of the present invention is to provide an improved shock absorber of the type described where the shock absorber includes an outer cylindrical body and an inner cylindrical body disposed concentrically within the outer cylindrical body so as to form an annular fluid reservoir therebetween, where a piston assembly is reciprocally moveable within the inner cylindrical body and divides the inner cylindrical body into a compression chamber and a recoil chamber, where the piston assembly has a damping fluid passage extending between the compression and recoil chambers so as to permit the damping fluid in the shock absorber to flow between these chambers, where the piston assembly includes a recoil valve and a compression valve for controlling the flow of damping fluid through the fluid passage, where both the recoil and compression valves are movable between open positions that permit the flow of damping fluid through the fluid passage and closed positions that restrict the flow of fluid through the fluid passage; where a piston rod is attached to the piston assembly and has an internal passage therein that extends to the piston assembly and that is connected, without the shock absorber, with a unit for supplying fluid under selectively variable pressures, where the pressurized fluid, introduced through the piston rod, biases the recoil and compression valves to their closed positions, where the damping fluid in the compression chamber, during the compression stroke, biases the piston compression valve to its open position, and where the damping fluid in the recoil chamber, during the recoil stroke, biases the recoil valve to its open position. A related object of the present invention is to provide an improved shock absorber of the type described where by simply changing the pressure of the pressurized fluid introduced into the piston and rod assembly, the dampening characteristics of the shock absorber may be readily adjusted.

Still another object of the present invention is to provide an improved shock absorber of the type described where the recoil and compression valves reciprocally move between their open and closed positions, where each of these valves have first and second ends, where the first ends of the recoil and compression valves are subjected to the pressure of the pressurized fluid introduced into the piston assembly through the piston rod, where the second end of the recoil valve is subjected, in part, to the pressure of the damping fluid in the recoil chamber, where the second end of the compression valve is subjected, in part, to the pressure of the damping fluid in the compression chamber, where when the recoil valve is in its closed position, its second end is forced against an aligned annular recoil valve seat having a radius less than the radius of the second end of the recoil valve, with the portion of the recoil valve's second end, radially outwardly from the recoil valve seat, being subjected to the pressure of the damping fluid in the recoil chamber, and where when the compression valve is in its closed position, its second end is forced against an aligned annular compression valve seat having a radius less than the radius of the second end of the compression valve, with the portion of the compression valve's second end, radially outwardly from the compression valve seat, being subjected to the pressure of the damping fluid in the compression chamber. A further related object of the present invention is to provide an improved shock absorber of the type described where the piston assembly of the shock absorber also includes a cylindrical valve seat member having the recoil valve seat at its one end, the compression valve seat at its other end, and a damping fluid passageway that extends between the valve seats and that constitutes a part of the damping fluid passage in the piston assembly so that when the recoil and compression valves are in their closed positions, the portions of each of their second ends, within the radii of their respective valve seats, are subject to the force of the damping fluid within the damping fluid passageway.

A further object of the present invention is to provide an improved shock absorber of the type described where the recoil valve, the compression valve, and the damping fluid passageway in the valve seat member are axially aligned, where the recoil and compression valves move between their open and closed positions in axially directions, where the damping fluid passageway includes high speed fluid restrictions, and where the recoil and compression valve seats are notched so that even when these valves are in their closed positions, the piston assembly may be displaced, at relatively slow speed, within the damping fluid chamber of the inner cylindrical body in response to applications of forces to the piston rod and/or the outer cylindrical body. Another related object of the present invention is to provide an improved shock absorber of the type described where the outer radii of the recoil and compression valves are substantially the same and where the radius of the recoil valve seat is greater than the radius of the compression valve seat.

These and other objects, advantages, and features of the present invention will be more fully understood from the following description of the preferred embodiment.

DETAILED DESCRIPTION OF THE PREFERRED EMBODIMENT

Figures 1, 2:
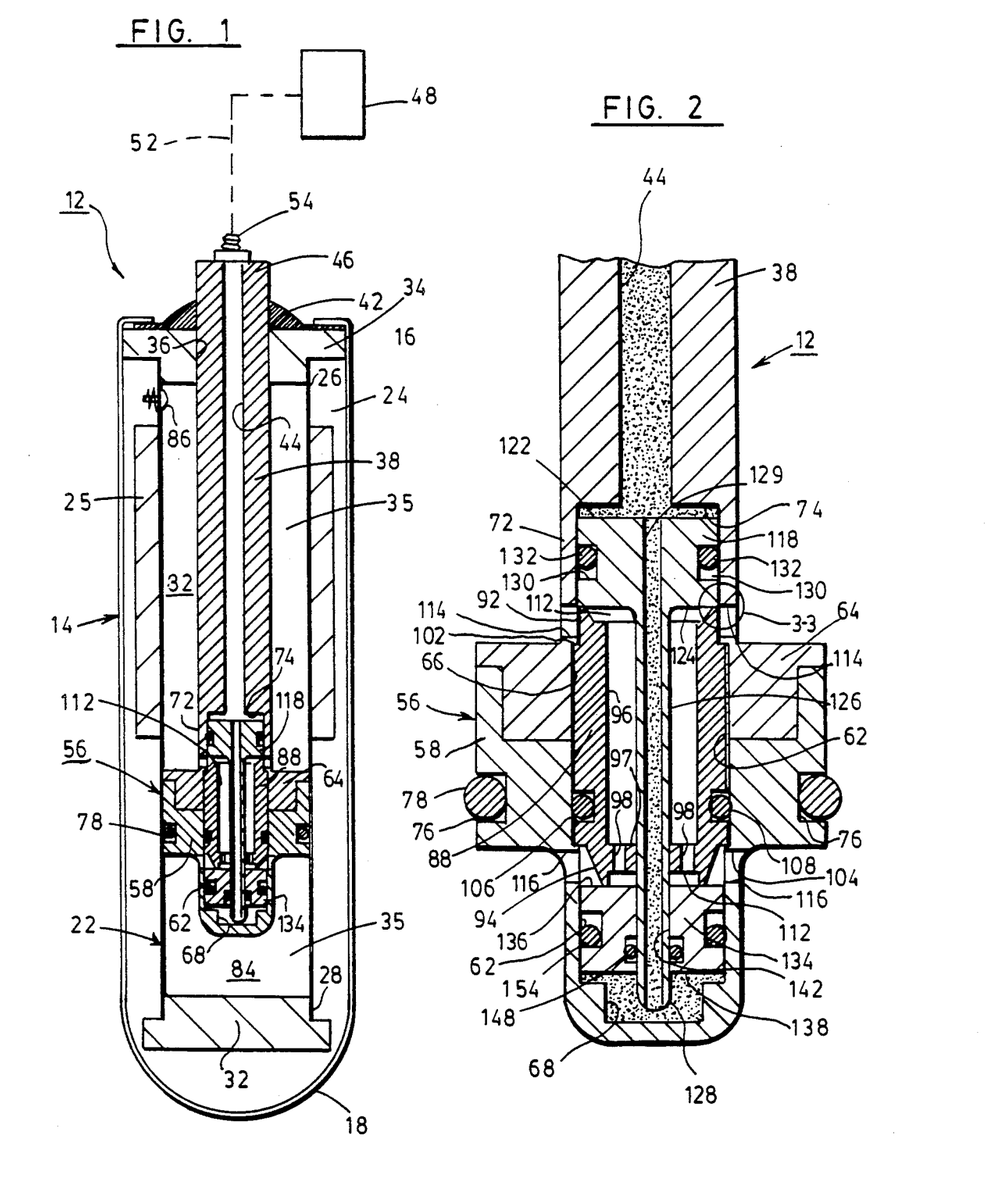
FIG. 1 is an axial, vertical cross-sectional, schematic view of a shock absorber of the present invention.
FIG. 2 is an enlarged, axial, vertical cross-sectional, schematic view of the piston assembly and the adjacent connected end of the piston rod of the present invention.

Referring now to FIG. 1, an improved adjustable hydraulic or other fluid shock absorber or damper of the present invention is shown generally at 12. This shock absorber includes a cylindrical outer body 14 having an upper end 16 and a closed, lower end 18. (In this description of the preferred embodiment, terms like "inner", "outer", "upper", "lower", "vertical", "horizontal", etc., have reference to the structure as it is shown in the drawings and are used solely for ease of description.) The outer body may be of conventional design and construction.

An inner cylindrical body 22 is disposed concentrically within the outer body 14 so as to define therebetween a generally annular reservoir 24 for the hydraulic fluid utilized, as the working or damping medium, in the shock absorber. A conventional closed cell foam sleeve 25 is disposed about a portion of the outer peripheral or side surface of the inner body. It permits the reservoir 24 to be completely filled with the damping fluid when the piston rod is fully extended.

The inner body 22 has a first, upper end 26 disposed generally adjacent to the upper end 16 of the outer body 14 and a second, lower end 28 disposed generally adjacent to the closed lower end 18 of the outer body. A compression head 32 serves to close the second end 28 of the inner body 22.

An inner cylinder head 34 is mounted on and between the upper end 16 of the outer body 14 and the first end 26 of the inner body 22. It serves to close both the upper end 16 and the first end 26, in a conventional manner, and thus also serves to close the upper end of the reservoir 24. The inner cylinder head 34, and the compression head 32, together with the inner side wall of the inner body 22, define a fluid chamber 35 within the inner body 22.

The inner cylindrical head 34 includes a central aperture 36 therethrough. The central axis of this aperture is coaxial with the central longitudinal axis of the inner body 22.

A piston rod 38 extends through the central aperture 36 in the inner head 34. Its outer cylindrical surface is sealed by a conventional shaft seal 42 that is mounted, with the inner cylinder head 34, at the upper end 16 of the outer cylindrical body 14. The piston rod 38 is adapted to reciprocally move, in a conventional manner, relative to the inner cylinder head 34 and the shaft seal 42, in a direction of movement parallel to the central longitudinal axis of the inner body 22.

The piston rod 38 includes a central fluid passage 44 that extends along its central longitudinal axis. The outer end 46 of the piston rod 38 (that is, the end that projects beyond the shock absorber 12) is adapted to be connected with a source of fluid under pressure, such as diagrammatically shown at 48. The pressure of the fluid supplied by this selectively pressurized fluid source 48 may be fixed or selectively varied in a conventional manner. Fluid line 52 from the pressurized fluid source 48 may be connected with the fluid passage 44 in the piston rod 38 by a conventional fitting, such as schematically shown at 54.

A piston assembly 56 is disposed within the damping fluid chamber 35 of the inner cylindrical body 22. The piston assembly 56 includes a first, generally cup-like member 58 that has a stepped axial bore 62 therein and that is generally Y-shaped, in vertical cross section. A second, annular member 64 is disposed and secured within the upper enlarged portion of the bore 62. The annular member 64 includes a central bore 66 that is aligned with and generally has the same diameter as the middle portion of the bore 62. (The extreme lower portion 68 of the bore 62 has a still smaller diameter.) The second annular member 64 may, if desired and as best shown in FIG. 2, be a part of the inner end 72 of the piston rod 38. In any event, the fluid passage 44 communicates with an enlarged diameter counterbore portion 74 that is adjacent to the inner end 72. This enlarged portion 74 is axially aligned with and slightly smaller, in diameter, than the central bore 66 and the central portion of the bore 62.

The outer circumferential surfaces of the upper portion of the first member 58 and the second member 64 are generally axially aligned, and their diameters are just slightly less than the inner diameter of the inner cylindrical side surface of the inner body 22. They together present a generally smooth, continuous (except as hereinafter noted) radially outwardly facing side surface for the piston assembly 56 so that the assembly 56 may reciprocally slide within the fluid chamber 35 of the inner body 22. A sealing ring groove 76 is disposed about the upper portion of the first member 58. A conventional sealing ring 78 is contained in the groove 76 and, as is conventional, prevents fluid in the fluid chamber 35 from leaking past the side surface of the piston assembly 56.

The piston assembly 56 divides the damping fluid chamber 35 in the inner body 22 into a recoil chamber 82 and a compression chamber 84. More particularly, the recoil chamber 82 is defined between the upper end of the piston assembly 56 and the lower end of the inner cylinder head 34, and the compression chamber 84 is defined between the lower end of the piston assembly 56 and the upper end of the compression head 32. Because during normal operation of the shock absorber 12, the volumes of the recoil and compression chambers vary, a conventional replenishing valve, not shown, may be mounted in the compression head 32, and a conventional spring biased replenishing valve, shown schematically at 86, may be mounted in the cylindrical wall of the inner body 22 or in the inner cylinder head 34. Both of these replenishing valves function in a conventional manner.

Returning again to the description of the piston assembly 56 and with specific reference to FIGS. 2-6, a cylindrical, annular valve seat member 88 is disposed within the bore 66 of the second annular member 64 and the middle portion of the bore 62 of the first member 58. It includes a side surface and upper and lower, oppositely facing, annular end surfaces that have substantially equal diameters. A recoil valve seat 92 is formed on the upper facing end surface of the valve seat member 88, and a compression valve seat 94 is formed on the lower facing end surface of the valve seat member.

Each of the valve seats 92 and 94 includes an annular distal end that tapers to a relatively narrow cross-section and that projects from its respective end surface of the member 88 in a direction generally parallel to the longitudinal axis of the member 88. The distal ends of the valve seats 92 and 94 are spaced radially inwardly, from the circumferential side surface of the valve seat member 88, a preselected distance. The outer radius of the distal end of the compression valve seat 94 is less than the outer radius of the distal end of the recoil valve seat 92.

The valve seat member 88 also includes a central passageway 96. It extends from one end of the member 88 to the other, with the upper and lower ends of this central passageway 96 being disposed within the projecting distal ends of the valve seats 92 and 94, respectively. This central passageway has a uniform diameter. A high speed restriction 97 is disposed in the central passageway, adjacent to the compression valve seat 94, and includes a central portion and a plurality of relatively small, axially directed, circumferentially equispaced diameter holes 98. Radially, inwardly directed shoulders 102 and 104, formed on the second member 64 and the first member 58, respectively, cooperate with the upper and lower end surfaces of the valve seat member 88 to hold the valve seat member in a fixed position relative to the members 58 and 64.

A sealing ring groove 106 is formed in and about the side of the valve seat member 88. A sealing ring 108 is disposed in that groove 106 and serves to prevent leakage between the valve seat member 88 and the bore 62.

The central passageway 96 in the valve seat member 88 is a part of an overall damping passage 112 in the piston assembly 56 that extends between the recoil chamber 82 and the compression chamber 84 and permits the working fluid, under certain conditions, to flow between these chambers. This passage 112 also includes a plurality of radially directed, circumferentially equispaced openings or holes 114, adjacent to the inner end 72 of the piston rod 38, and a plurality of radially directed circumferentially equispaced openings or holes 116 in the member 58, adjacent to the compression seat 94. These openings 114 and 116 permit damping fluid in the recoil chamber and the compression chamber, respectively, to communicate with the radially outwardly facing surfaces of the distal ends of the valve seats 92 and 94.

A cylindrical recoil valve 118 is disposed within the enlarged portion 74 of the passage 44. It is adapted to move reciprocally in the portion 74 in directions substantially parallel to the longitudinal central axis of the passage 44. The recoil valve 118 has upper and lower facing end surfaces 122 and 124 that are substantially parallel and that are perpendicular to the direction of movement of the valve 118. These surfaces both have the same diameters.

The lower surface 124 includes a central, tubular downwardly extending member 126 that projects, slidingly, through an opening in the central portion of the high speed restriction 97. Its lower end 128 is disposed adjacent to the lower portion 68 of the bore 62 of the member 58. An axial passage 129 in the valve 118 extends downwardly from its upper end surfaces 122 and communicates with the interior of this tubular member 126 thereby permitting the interior of the tubular member 126 to be in communication with and to transmit the pressurized fluid introduced in the fluid passage 44.

The recoil valve 118 has an annular sealing groove 130 formed about its outer, side surface. A conventional sealing ring 132 is disposed within that groove 130 and functions to prevent any leakage of fluids between the side surface of the recoil valve 118 and the enlarged portion 74 of the member 38.

The pressure of the fluid, which is introduced in the passage 44 and which acts upon the upper end surface 122 of the recoil valve 118, biases the recoil valve 118 to a closed position. In its closed position, the lower end surface 124 of the recoil valve 118 abuts against the projecting distal end of the recoil valve seat 92 thereby restricting the flow of damping fluid therebetween.

A cylindrical compression valve 134 is disposed within the lower part of the middle portion of the bore 62, immediately above the lower end portion 68 of that bore. It is adapted to move reciprocally therein in directions substantially parallel to the longitudinal central axis of the bore 62 which, as noted above, is coaxial to the longitudinal central axis of the passage 44. The compression valve 134 includes an upper facing end surface 136 that is adjacent to and facing the compression valve seat 94 and a lower end surface 138 that is adjacent to and faces the end portion 68 of the bore 62. Like the surfaces 122 and 124 of the recoil valve 118, the surfaces 136 and 138 are parallel to each other and are perpendicular to the longitudinal central axis of the bore 62. These surfaces also have the same diameters.

The compression valve 134 includes a central bore 142 that is adapted to tightly but slidingly receive the lower end 128 of the tubular member 126 of the recoil valve 118. Specifically, the lower end 128 is adapted to reciprocally slide within the bore 142, with the relative movements of the valves 118 and 134 being such that the lower end 128 never exits the bore 142 during normal usage of the shock absorber 12.

Figure 6:
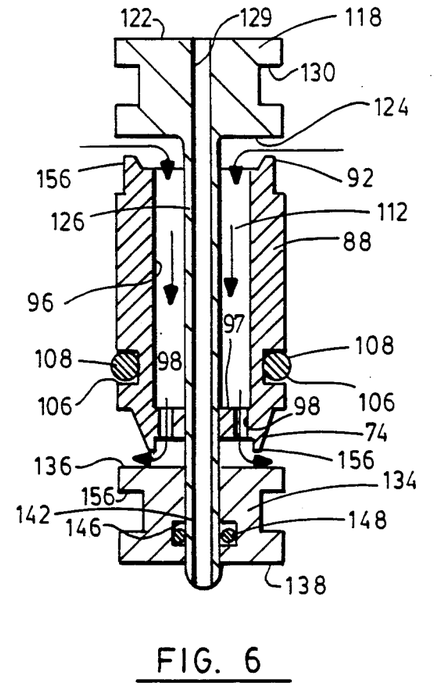
FIG. 6 is a view similar to that of FIG. 5 showing both the recoil and compression valves in their opened positions.

As shown in FIG. 6, a sealing groove 146 is formed about the bore 142. A conventional sealing ring 148 is disposed in the groove 146 and functions to prevent leakage of fluids between the tubular member and the inner surface of the central bore 142 as the tubular member 126 moves relative to the compression valve 134. A sealing groove 152 is also formed in the outer side surface of the compression valve 134. A conventional sealing ring 154 shown in FIG. 2, is disposed within that groove and functions to prevent the leakage of damping fluid the pressurized fluid between the outer side surface of the compression valve 134, and the inner cylindrical surface of the adjacent bore 62.

The tubular member 126 and the passage 129, communicates a fluid under pressure, from passage 44 to the lower end surface 138 of the compression valve 134. The force of this fluid pressure biases or urges the valve 134 to its closed position. In that position, the upper end surface 136 of the valve 134 abuts against the projecting distal end of the compression valve seat 94 thereby restricting the flow of damping fluid therebetween.

Figure 3:
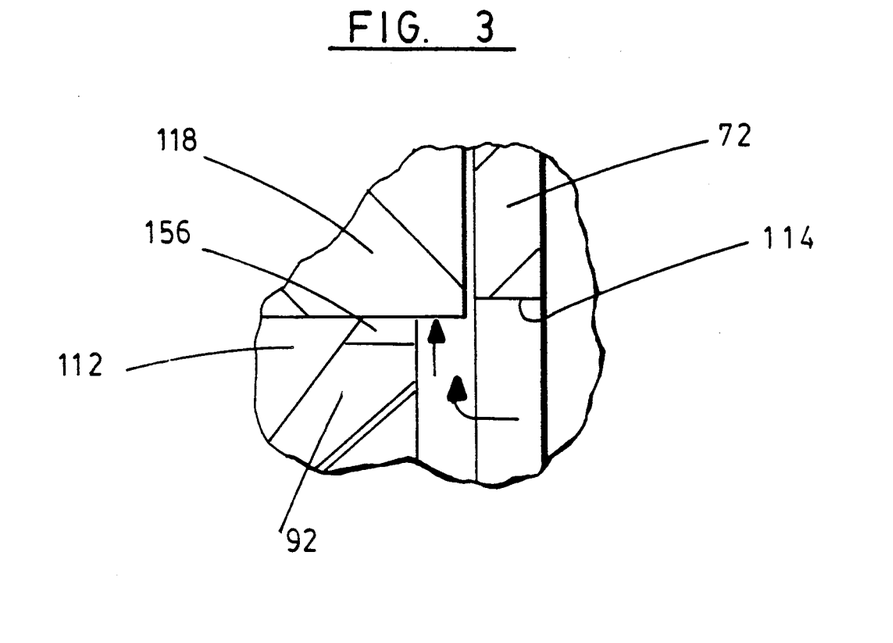
FIG. 3 is an enlarged cross-sectional view of the piston assembly and the adjacent connected end of the piston rod indicated by the line 3—3 in FIG. 2.
Figure 4:
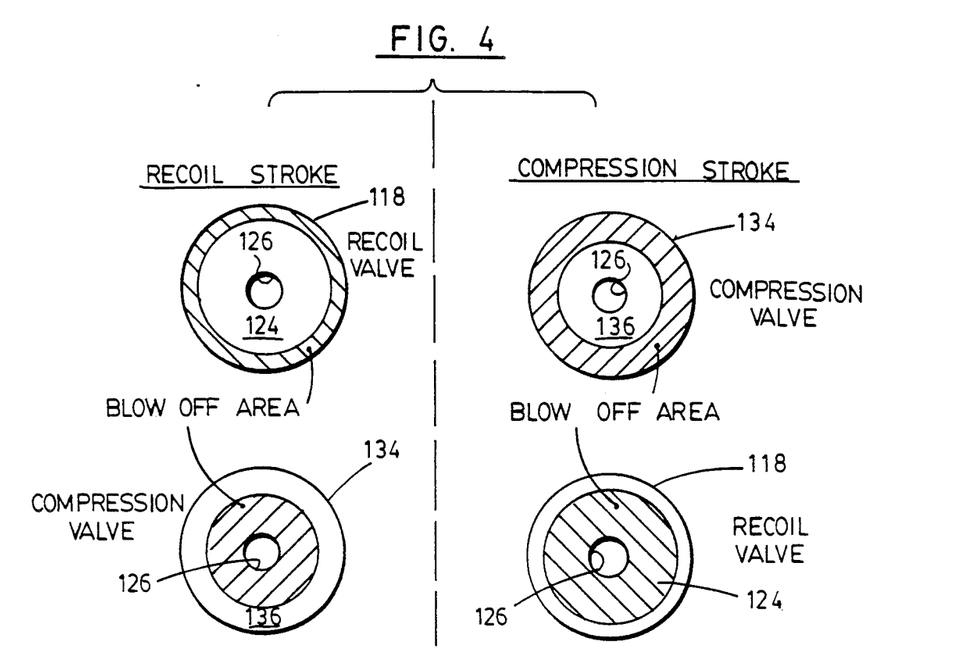
FIG. 4 are elevational views of the second ends of the recoil and compression valves, showing the different portions of the second ends of these valves that are subjected to damping fluid pressures during the recoil stroke and the compression stroke.

As noted above, the outer radii of the projecting distal ends of the recoil and compression valve seats 92 and 94 are less than the radii of the recoil and compression valves 118 and 134, respectively. Accordingly and as best illustrated in FIGS. 3 and 4, only the radially outer, annular portions of the end surfaces 124 and 136 (that is, the annular portions beyond where the distal ends of the valve seats 92 and 94 abut these surfaces) of the valves 118 and 134 are subject to the pressure of the damping fluid in the recoil chamber and compression chambers 82 and 84, respectively. The selectively pressurized fluid pressure acts over substantially all of the area of the end surfaces 122 and 138 (except for the transverse areas of the central passage 129 and that of the tubular member 126). Consequently, a relatively low fluid pressure can be employed with the shock absorber 12 and maintain the valves 118 and 134 in their closed positions (that is, with their end surfaces 124 and 136 abutting the projecting distal ends of their respective valve seats 92 and 94).

More specifically the annular area of the surface 124 of the recoil valve 118 that is subject to the pressure of the damping fluid in the recoil chamber 82 during a recoil stroke is shown as the cross hatched area in the upper, left-hand figure in FIG. 4. Similarly, the annular area of the surface 136 of the compression valve 134 that is subject to the pressure of the damping fluid in the compression chamber 84 during a compression stroke is shown as the cross hatched area in the upper right hand figure in FIG. 4.

Figure 5:
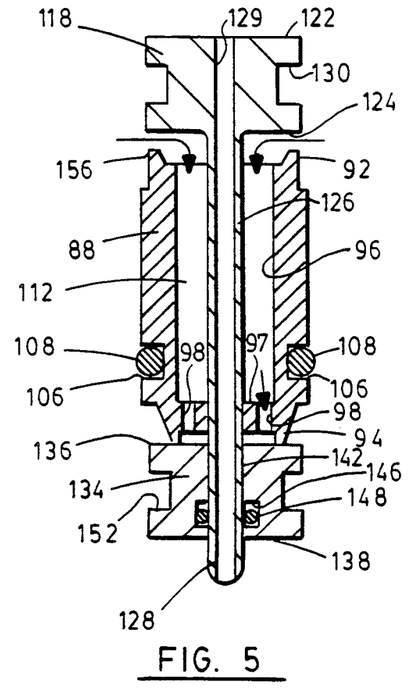
FIG. 5 is a partial, axial vertical cross-sectional view of the relative positions of the recoil valve, the compression valve and the cylindrical valve seat member during a recoil stroke and after the recoil valve has first been moved to its open position and the compression valve is still in its closed position.

Referring now to FIGS. 4-6, when a relatively high speed recoil stroke occurs in the shock absorber 12 (caused by a force being suddenly imposed on the piston rod 38, on the outer body 14 or on both), the pressure of the damping fluid in the recoil chamber 82 rises rapidly. The increasing pressure of this damping fluid will, at last, cause sufficient force to be exerted on the outer annular area of the surface 124 of the recoil valve 118 that it will overcome the counter biasing force being exerted by the pressurized fluid on the surface 122. At this time and as shown in FIG. 5, the recoil valve will move to its open position (that is, where the surface 124 is spaced from the projecting distal ends of the recoil valve seat 92). The high pressure damping fluid in the recoil chamber 82 will then pass between the seat 92 and the recoil valve 118 and into the central passageway 96. The pressure of this recoil chamber fluid will thus be imposed upon the central portion of the surface 136 of the compression valve 134. Since the area of this central portion of the surface 136 is relatively large (as shown in the lower lefthand figure in FIG. 4), the damping fluid pressure will quickly cause the compression valve to be moved from its closed position to its open position (as shown in FIG. 6) so that damping fluid can pass through the passageway 96 into the compression chamber 84. When the pressure of the damping fluid in the recoil chamber decreases sufficiently, the valves 118 and 134 will again return to their normal closed positions under the biasing force of the pressurized fluid acting on the surfaces 122 and 138 of the valves 118 and 134, respectively.

In a similar manner, when a relatively high speed compression stroke occurs in the shock absorber 12, the pressure of the damping fluid in the compression chamber 84 will increase, and the force exerted by this fluid on the outer annular area of the surface 136 of the valve 134, (that is, the area of the surface 136 radially without the projecting distal ends of the compression valve seat 94 and shown by cross hatching in the upper right hand figure in FIG. 4) will likewise increase. The compression valve 134 will remain in its closed position until the increasing force exerted by this fluid exceeds the force exerted by the pressurized fluid on the surface 138 of the valve 134. At that time, the valve 134 will be moved to its open position so that damping fluid can pass between the projecting distal end of the valve seat 94 and the surface 136. As indicated by cross hatching in the lower right hand figure in FIG. 4, the central area of the surface 124 of the recoil valve 118 (that is, the area within the projecting distal end of the recoil seat 92) will then be subjected to the pressure of the damping fluid in the compression chamber 84. Since this area is relatively large, the recoil valve 118 will be quickly moved to its opened position thereby allowing fluid from the compression chamber 84 to flow through the passage 112 to the recoil chamber 82.

To permit low speed flow of damping fluid between the chambers 82 and 84 (as during a relatively low speed recoil or compression stroke of the piston assembly 56), a single notch or a plurality of notches, shown at 156, may be included in the projecting distal ends of the recoil and compression valve seats 92 and 94. These notches permit a limited or restricted flow of damping fluid across the valve seats even when the valves 118 and 134 are in their closed positions.

Figure 7:
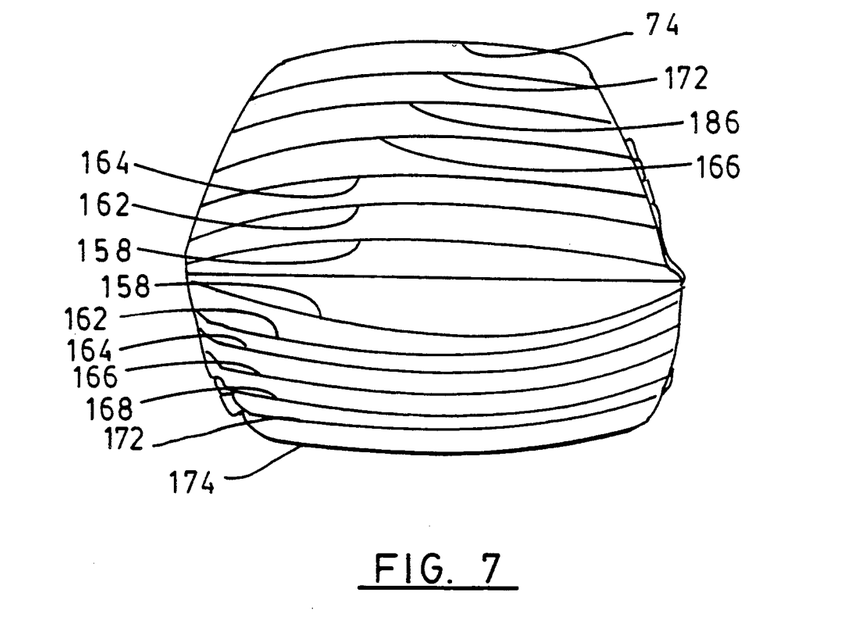
FIG. 7 shows a loop chart family of curves showing how both the recoil and compression forces are changed by varying the fluid pressure of the second fluid introduced into the piston assembly.

A loop chart family of curves for a shock absorber, such as the absorber 12, is shown in FIG. 7. In these curves, force is plotted along the ordinate (Y axis) while piston assembly displacement is plotted along the abscissa (X axis). The shock absorber was cycled at a constant stroke rate of 75 cycles per minute. In this instant case the selectively variable fluid was a gaseous medium (i.e., air) and the damping fluid was a petroleum based liquid. The air pressure introduced into the piston assembly via fluid passage 44 was varied from 0 to 120 PSIG at 20 PSIG increments. The results of the tests are shown in the Table 1 below.

TABLE 1

| Curve No. | PSIG | Recoil Force | Compression Force |
|---|---|---|---|
| 158 | 0 | 57 | 92 |
| 162 | 20 | 114 | 118 |
| 164 | 40 | 161 | 148 |
| 166 | 60 | 216 | 180 |
| 168 | 80 | 268 | 214 |
| 172 | 100 | 312 | 243 |
| 174 | 120 | 360 | 277 |

This loop chart family of curves of FIG. 7 clearly demonstrates that increasing the valve controlling fluid pressure results in correspondingly higher recoil and compression forces during the recoil and compression strokes of the shock absorber.

The family of curves in FIG. 7 were developed by the use of a prototype shock absorber. In that prototype, the components had the following dimensions:

| Component | Dimension |
|---|---|
| O.D. of the piston assembly | 1.375 inches |
| O.D. of the compression valve | 0.560 inches |
| O.D. of the distal ends of the recoil valve seat | 0.535 inches |
| I.D. of the distal ends of the recoil valve seat | 0.440 inches |
| O.D. of the distal ends of the compression valve seat | 0.420 inches |
| I.D. of the distal ends of the compression valve seat | 0.365 inches |
| O.D. of the high speed restriction holes | 0.060 inches |
| Number of the high speed restriction holes | 5. |
| O.D. of the tubular member | 0.125 inches |
| I.D. of the tubular member | 0.062 inches |

The improved infinitely adjusted shock absorber or damper of the present invention affords a number of commercially significant advantages. First and probably foremost, is its simplicity. A minimum number of parts are required to give relatively large changes in damping forces. Additionally, the recoil to compression force ratio is not limited to the ratio of the piston rod diameter to the piston assembly diameter. Moreover, changing the valve seat sizes (that is, the radius of the valve seat relative to the radius of the recoil or compression valve), directly affects the force necessary to move the recoil and compression valves to their open positions. In other words, using different valve seat configurations for recoil and compression valves will change the overall force ratio. Further, the damping force levels are consistent and repeatable. This is because there are no mechanical springs in the piston valving assembly. The shock absorbers of the present invention would also work, if designed, as a strut and has an added advantage of having an acceptable "dead" length. Lastly, the improved shock absorber can be used without a relatively sophisticated, infinitely adjustable fluid pressure controller. In other words, this shock absorber can be used as a multi positioned unit wherein the pressure supply will only supply fluid pressures at a specific preselected and fixed pressure level.

The preferred embodiment of the present invention has now been described. This preferred embodiment consists of the best mode contemplated by the inventor for carrying out his invention. Because his invention may be copied without copying the precise details of the preferred embodiment, the following claims particularly point out and distinctly claim the subject matter which the inventor regards as his invention and which he seeks to protect.

What is claimed is:

1. An improved infinitely adjustable shock absorber for vehicle suspensions that utilizes variable fluid pressures to change its dampening characteristics, both during its compression stroke and its recoil stroke, the improved shock absorber comprising:

an outer cylindrical body having a closed end and an open end;

an inner cylindrical body that is disposed concentrically within the outer cylindrical body so as to define an annular damping fluid reservoir therebetween, that has an interior cylindrical surface which defines a fluid chamber within the inner cylindrical body, and that has a first end and a second end, with the second end of the inner cylindrical body being disposed adjacent to the closed end of the outer cylindrical body and with the first end of the inner cylindrical body being disposed adjacent to the open end of the outer cylindrical body;

an inner cylinder head closing the first end of the inner cylindrical body and the open end of outer cylindrical body, with the inner cylinder head having a sealed aperture therein;

a compression head assembly closing the second end of the inner cylindrical body;

a piston assembly disposed within the damping fluid chamber of the inner cylindrical body and adapted to reciprocally move therein, the piston assembly having a first end adjacent to the first end of the inner cylindrical body, a second end adjacent to the second end of the inner cylindrical body, and an outer peripheral side surface that is adjacent to the interior surface of the inner cylindrical body and that includes means for forming a fluid seal between the outer side surface of the piston assembly and the interior surface of the inner cylindrical body so that the piston assembly divides the damping fluid chamber into a recoil chamber, adjacent to the first end of the inner cylindrical body; and a compression chamber, adjacent to the second end of the inner cylindrical body, the piston assembly also having a valved fluid passage therein that extends between its first and second ends so as to permit fluid to flow between the recoil chamber and the compression chamber;

a piston rod having a first end and a second end that is attached to the first end of the piston assembly and having its first end extending through the sealed aperture in the inner cylinder head and out of the damping fluid chamber, the piston rod having an internal passage therein that extends between the second end of the piston rod and the first end of the piston rod, with the fluid passage being connectable, adjacent to the first end of the piston rod, with means for supplying fluid under selectively variable pressures; and means for controlling the flow of damping fluid through the fluid passage in the piston assembly, with the controlling means including at least one valve in the damping fluid passage moveable between an open position where damping fluid may flow through the damping fluid passage and a closed position where the flow of fluid is substantially restricted through said fluid passage, and with first means, subject the pressure of the fluid in the rod fluid passage, for biasing the movable valve towards its closed position and second means, subject to the pressure of the damping fluid in the recoil chamber during the recoil stroke of the shock absorber and subject to the pressure of the damping fluid in the compression chamber during the compression stroke of the shock absorber, for biasing the movable valve toward its open position so that the movable valve will be moved to its open position whenever the force of the damping fluid exerted on the second means exceeds the force exerted by the pressurized fluid pressure on the first means.

2. The improved shock absorber of claim 1 wherein controlling means includes: a cylindrical recoil valve having a first end and a second opposed end, with the first end being subjected to the pressure of the selectively pressurized fluid and with the second end being subjected, in part, to the pressure of the damping fluid in the recoil chamber, the recoil valve being movable in directions substantially perpendicular to the planes of its first and second ends, between an open position where fluid from the recoil chamber may flow through the valved fluid passage and a closed position where flow of fluid through the valved fluid passage from the recoil chamber is substantially restricted; and a cylindrical compression valve having a first end and a second opposed end, with the first end being subjected to the pressure of the selectively pressurized fluid and with the second end being subjected, in part, to the damping fluid in the compression chamber, the compression valve being movable in directions substantially parallel to the planes of its first and second ends, between an open position where fluid from the compression chamber may flow through the open damping fluid passage and a closed position where the flow of fluid through the fluid passage from the compression chamber is substantially restricted.

3. The improved shock absorber of claim 2 wherein when the recoil valve is in its closed position, its second end abuts against an aligned, annual recoil valve seat that has a radius less than the radius of the second end of the recoil valve and the portion of the second end of the recoil valve, radially outwardly from the recoil seat, is subjected to the pressure of the damping fluid from the recoil chamber; and wherein when the compression valve is in its closed position, its second end abuts against an aligned, annular compression valve seat that has a radius less than the radius of the second end of the compression valve and the portion of the second end of the compression valve, radially outwardly from the compression seat, is subjected to the pressure of the damping fluid in the compression chamber.

4. The improved shock absorber of claim 3 wherein the piston assembly includes a cylindrical valve seat member having the recoil seat at its one end and the compression seat at its other end and having a fluid passageway that extends between the recoil seat and the compression seat and that constitutes a part of the damping fluid passage so that when the recoil valve is in its closed position, the portion of the second end of the recoil valve within the radius of the recoil seat is subjected to the force of the damping fluid within the damping fluid passageway and so that when the compression valve is in its closed position, the portion of the second end of the compression valve within the radius of the compression valve seat is subjected to the pressure of the fluid within the fluid passageway.

5. The improved shock absorber of claim 4 wherein the recoil valve, the compression valve and the fluid passageway are axially aligned; and wherein the directions of movement of the recoil valve and the compression valve are parallel.

6. The improved shock absorber of claim 4 wherein the fluid passageway includes high speed restrictions; and wherein recoil seat and the compression seat includes means for permitting a relatively small flow of damping fluid between the recoil seat and recoil valve and between the compression seat and the compression valve, respectively, when the valves are in their closed positions so as to allow relatively low speed displacement of the piston assembly within the damping fluid chamber in response to applications of small forces to one and both of the piston rod and the outer cylindrical body.

7. The improved shock absorber of claim 4 wherein the outer radius of the recoil valve and the outer radius of the compression valve are substantially the same; and wherein the radius of the recoil seat is greater than the radius of the compression seat.

8. The improved shock absorber of claim 4 wherein the first end of the recoil valve is adjacent to the end of the pressurized fluid passage that is adjacent to the second end of the piston rod; wherein the recoil valve includes a first passage extending from its first end to its second end; wherein the compression valve includes bore extending from its first end to its second end; and wherein the means for communicating fluid under selective pressure includes the first passage and a tubular member that slidably extends through the bore in the compression valve.

9. The improved shock absorber of claim 8 wherein the first passage in the recoil valve and the bore in the compression valve are axially aligned; and wherein the tubular member extends from the recoil valve through the bore in the compression valve.

10. The improved shock absorber of claim 9 wherein the pressurized fluid passage in the piston rod, the recoil valve, the compression valve and the damping fluid passageway are axially aligned; wherein the directions of movement of the recoil valve and directions of movement of the compression valve are parallel; wherein the damping fluid passageway includes high speed restrictions; wherein recoil seat and the compression seat includes means for permitting a relatively small flow of damping fluid between the recoil seat and recoil valve and between the compression seat and the compression valve, respectively, when the valves are in their closed positions so as to allow relatively low speed displacement of the piston assembly within the fluid chamber in response to applications of small forces to one and both of the piston rod and the outer cylindrical body; wherein the outer radius of the recoil valve and the outer radius of the compression valve are substantially the same; and wherein the radius of the recoil seat is greater than the radius of the compression seat.

11. In an adjustable shock absorber for vehicle suspensions having: an outer cylindrical body having a closed end and an open end; an inner cylindrical body that is disposed concentrically within the outer cylindrical body so as to define an annular damping fluid reservoir therebetween, that has an interior cylindrical surface which defines a damping fluid working chamber within the inner cylindrical body, and that has a first end and a second end, with the second end of the inner cylindrical body being disposed adjacent to the closed end of the outer cylindrical body and with the first end of the inner cylindrical body being disposed adjacent to the open end of the outer cylindrical body; an inner cylinder head closing the first end of the inner cylindrical body and the open end of outer cylindrical body, with the inner cylinder head having a sealed aperture therein; a compression head assembly closing the second end of the inner cylindrical body, the improvement comprising:

a piston assembly disposed within the inner cylindrical body filled with a damping fluid and adapted to reciprocally move therein, the piston assembly having a first end adjacent to the first end of the inner cylindrical body, a second end adjacent to the second end of the inner cylindrical body, and an outer peripheral side surface that is adjacent to the interior surface of the inner cylindrical body and that includes means for forming a fluid seal between the outer side surface of the piston assembly and the interior surface of the inner cylindrical body so that the piston assembly divides the damping fluid chamber into a recoil chamber, adjacent to the first end of the inner cylindrical body; and a compression chamber, adjacent to the second end of the inner cylindrical body, the piston assembly also having a fluid passage therein that extends between its first and second ends so as to permit damping fluid to flow between the recoil chamber and the compression chamber;

a piston rod having a first end and a second end that is attached to the first end of the piston assembly and having its first end extending through the sealed aperture in the inner cylinder head and out of the damping fluid chamber, the piston rod having an internal fluid passage therein that extends between its second end and the first end of the piston rod, with the fluid passage being connectable, adjacent to the first end of the piston rod, with means for supplying a second fluid under selectively variable pressures; and means for controlling the flow of damping fluid through the fluid passage in the piston assembly, with the controlling means including at least one moveable valve in the damping fluid passage movable between an open position where damping fluid may flow through the fluid passage and a closed position where the flow of passage, and with first means, subject the pressure of the second fluid in the piston rod passage, for biasing the movable valve towards its closed position and second means, subject to the pressure of the damping fluid in the recoil chamber during the recoil stroke of the shock absorber and subject to the pressure of the damping fluid in the compression chamber during the compression stroke of the shock absorber, for biasing the movable valve toward its open position so that the movable valve will be moved to its open position whenever the force of the damping fluid exerted on the second means exceeds the force exerted by the selectively pressurized fluid pressure on the first means.

12. The improved shock absorber of claim 11 wherein controlling means include: a cylindrical recoil valve having a first end and a second opposed end, with the first end being subjected to the pressure of the selectively pressurized fluid and with the second end being subjected, in part, to the pressure of the damping fluid in the recoil chamber, the recoil valve being movable in directions substantially perpendicular to the planes of its first and second ends, between an open position where damping fluid from the recoil chamber may flow through the recoil valve fluid passage and a closed position where flow of fluid through the fluid passage from the recoil chamber is substantially restricted; and a cylindrical compression valve having a first end and a second opposed end, with the first end being subjected to the pressure of the selectively pressurized fluid and with the second end being subjected, in part, to the damping fluid in the compression chamber, the compression valve being movable in directions substantially parallel to the planes of its first and second ends, between an open position where fluid from the compression chamber may flow through the fluid passage including the compression valve and a closed position where the flow of fluid through the fluid passage from the compression chamber is substantially restricted.

13. The improved shock absorber of claim 12 wherein when the recoil valve is in its closed position, its second end abuts against an aligned, annual recoil valve seat that has a radius less than the radius of the second end of the recoil valve and the portion of the second end of the recoil valve, radially outwardly from the recoil seat, is subjected to the pressure of the damping fluid from the recoil chamber; and wherein when the compression valve is in its closed position, its second end abuts against an aligned, annular compression valve seat that has a radius less than the radius of the second end of the compression valve and the portion of the second end of the compression valve, radially outwardly from the compression seat, is subjected to the pressure of the damping fluid in the compression chamber.

14. The improved shock absorber of claim 13 wherein the piston assembly includes a cylindrical valve seat member having the recoil seat at its one end and the compression seat at its other end and having a damping fluid passageway that extends between the recoil seat and the compression seat and that constitutes a part of the damping fluid passage so that when the recoil valve is in its closed position, the portion of the second end of the recoil valve within the radius of the recoil seat is subjected to the force of the damping fluid within the damping fluid passageway and so that when the compression valve is in its closed position, the portion of the second end of the compression valve within the radius of the compression valve seat is subjected to the pressure of the damping fluid within the damping fluid passageway.

15. The improved shock absorber of claim 14 wherein the recoil valve, the compression valve and the fluid passageway are axially aligned; and wherein the directions of movement of the recoil valve and the compression valve are parallel.

16. The improved shock absorber of claim 14 wherein the damping fluid passageway includes high speed restrictions; and wherein the recoil seat and the compression seat includes means for permitting a relatively small flow of damping fluid between the recoil seat and recoil valve and between the compression seat and the compression valve, respectively, when the valves are in their closed positions so as to allow relatively low speed displacement of the piston assembly within the damping fluid chamber in response to applications of small forces to one and both of the piston rod and the outer cylindrical body.

17. The improved shock absorber of claim 14 wherein the outer radius of the recoil valve and the outer radius of the compression valve are substantially the same; and wherein the radius of the recoil seat is greater than the radius of the compression seat.

18. The improved shock absorber of claim 14 wherein the first end of the recoil valve is adjacent to the end of the piston rod fluid passage that is adjacent to the second end of the piston rod; wherein the recoil valve includes a first passage extending from its first end to its second end; wherein the compression valve includes bore extending from its first end to its second end; and wherein the means for communicating fluid under pressure includes the first passage and a tubular member that slidably extends through the bore in the compression valve.

19. The improved shock absorber of claim 18 wherein the first passage in the recoil valve and the bore in the compression valve are axially aligned; and wherein the tubular member extends from the recoil valve through the bore in the compression valve.

20. The improved shock absorber of claim 19 wherein the selectively pressurized fluid passage in the piston rod, the recoil valve, the compression valve and the damping fluid passageway are axially aligned; wherein the directions of movement of the recoil valve and directions of movement of the compression valve are parallel; wherein the damping fluid passageway includes high speed restrictions; wherein recoil seat and the compression seat includes means for permitting a relatively small flow of damping fluid between the recoil seat and recoil valve and between the compression seat and the compression valve, respectively, when the valves are in their closed positions so as to allow relatively low speed displacement of the piston assembly within the damping fluid chamber in response to applications of small forces to one and both of the piston rod and the outer cylindrical body; wherein the outer radius of the recoil valve and the outer radius of the compression valve are substantially the same; and wherein the radius of the recoil seat is greater than the radius of the compression seat.

* * * * *

UNITED STATES PATENT AND TRADEMARK OFFICE
CERTIFICATE OF CORRECTION

PATENT NO. : 5,097,929
DATED : March 24, 1992
INVENTOR(S) : Louis M. Spoto It is certified that error appears in the above-identified patent and that said Letters Patent is hereby corrected as shown below: Column 11, Claim 2-line 49, the word "parallel" should be "perpendicular"

Claim 3-line 58, the word "annual" should be "annular"
Column 13,
Claim 11-line 64 following the word "of", insert, "damping fluid is substantially restricted through the fluid".
Column 14,
Claim 12-line 30, change the word "parallel" to read "perpendicular".
Column 14,
Claim 13-line 38, change the word "annual" to read "annular".

Figure 7 numbers on the right side of the figure, number 74 should be 174.

Signed and Sealed this

Twenty-fourth Day of August, 1993

Attest:

BRUCE LEHMAN

*Attesting Officer*     *Commissioner of Patents and Trademarks*